United States Patent [19]

Heuring et al.

[11] Patent Number: 4,900,115

[45] Date of Patent: Feb. 13, 1990

[54] OPTICAL LOGIC CIRCUIT USEFUL FOR BIT SERIAL OPTIC COMPUTING

[75] Inventors: Vincent P. Heuring, Boulder; Harry F. Jordan, Jamestown; Jonathan P. Pratt, Boulder, all of Colo.

[73] Assignee: University of Colorado Foundation, Inc., Boulder, Colo.

[21] Appl. No.: 305,893

[22] Filed: Jan. 31, 1989

[51] Int. Cl.$^4$ ............................ G02B 6/26; G02B 6/28
[52] U.S. Cl. ............................ 350/96.15; 350/96.16; 455/610; 364/173
[58] Field of Search ............... 350/96.13, 96.15, 96.16, 350/96.29; 455/610, 612, 600; 364/173

[56] References Cited

U.S. PATENT DOCUMENTS

| | | | |
|---|---|---|---|
| 4,133,915 | 1/1979 | Noethe et al. | 427/160 |
| 4,418,394 | 11/1983 | Tai | 364/746 |
| 4,472,019 | 9/1984 | Bishop et al. | 350/96.30 |
| 4,621,113 | 11/1986 | Collins | 524/196 |
| 4,631,329 | 12/1986 | Gornowicz et al. | 528/28 |
| 4,667,300 | 5/1987 | Guilfoyle | 364/713 |
| 4,739,520 | 4/1988 | Collins, Jr. et al. | 455/600 |

OTHER PUBLICATIONS

Optical Fiber Telecommunications by S. E. Miller and I. P. Kaminow, Academic Press (1988), Chapter 11, "Waveguide Electro-Optic Devices for Optical Fiber Communication" pp. 12–28.
S. D. Smith, A. C. Walker, B. S. Wherrett, F. A. P. Tooley, J. G. H. Mathew, M. R. Taghizadah and I. Janossy, "Cascadable Digital Optical Logic Circuit Elements in the Visible and Infrared: Demonstration of Some First Optical Circuits", *Applied Optics*, 25, 1586–1593 (May 15, 1986).
J. Tanida and Y. Ichioka, "OPALS: Optical Parallel Array Logic System":, *Applied Optics*, 25, 1565–1570 (May 15, 1986).
A. Huang, "Architectural Considerations Involved in the Design of an Optical Digital Computer", *Proceedings of the IEEE*, 72 780–786 (Jul. 1984).
F. C. Williams, T. Kilburn and G. C. Toothill, "Universal High-Speed Digital Computers: a Small-Scale Experimental Machine", *Proceedings IEEE*, 98, 107–120 (1951).
S. P. Frankel, "The Logical Design of a Simple General Purpose Computer", *IRE Transactions on Electronic Computers*, 5–14 (Mar. 1957).
J. H. Wilkinson, "The Pilot ACE", in *Computer Structures: Readings and Examples*, C. G. Bell and A. Newell, (eds.), McGraw Hill, New York, 1971.
S. K. Korotky, G. Eisenstein, R. C. Alferness, J. J. Veselka, L. L. Buhl, G. T. Harvey and P. H. Read, "Fully Connectorized High-Speed Ti:LiNbO$_3$ Switch/Modulator for Time-Division Multiplexing and Data Encoding":, *J. Lightwave Technology*, LT-3 1–6 (1985).
"2×2 Lithium Niobate Polarization-Independent Electro-Optical Switch", AT & T Engineering Prototype Specification A4335, *AT & T Technologies*, Allentown PA, Jan. 1987.
"OGW 2×2 Switch", data sheet, Crystal Technology Inc. Palo, CA, 1987.
"A Bit Serial Architecture for Optical Computing" by Heuring et al., dated Jan. 1988, pp. 1–22.
"Optical Fiber Telecommunicatons" chapter 11.

*Primary Examiner*—William L. Sikes
*Assistant Examiner*—Akm E. Ullah
*Attorney, Agent, or Firm*—Earl C. Hancock

[57] ABSTRACT

Optical elements are combined into modules capable of performing logic functions in response to light pulses which are received from a source as clock pulses or data pulses. The module is effectively an all optical switching network. An optical delay line provides optical memory. The pulses that are produced at the delay line output are restored by selective reentry of light pulses from a continuously operable source so that the pulse information is storable indefinitely. The module is useful for a variety of computer and computer related design functions.

3 Claims, 3 Drawing Sheets

| Name | Connection | Logic Symbol | Equation |
|---|---|---|---|
| AND |  |  | AC |
| AND-NOT (Inhibition) |  |  | A$\overline{C}$ |
| NOT |  |  | $\overline{C}$ |
| BUFFER |  |  | C |
| 2 in 1 out MUX |  |  | AC + B$\overline{C}$ |
| 2 in 1 out MUX Inverted Select |  |  | A$\overline{C}$ + BC |
| 1 in 2 out DeMUX |  |  | D = AC<br>E = A$\overline{C}$ |
| OR |  |  | a + b |
| SPLITTER (Fanout) |  | | a |

OPTICAL LOGIC CIRCUIT USEFUL FOR BIT SERIAL OPTIC COMPUTING

TECHNICAL FIELD

The present invention relates to components for performing logical operations optically. More particularly, the present invention relates to modules that employ optical switching components to perform logic functions which are combinable with other optically switching modules to produce more complex operations and computations.

BACKGROUND OF THE INVENTION

In recent years, interest has significantly increased in the use of photons rather than electrons for conveying information. Some of the research in this regard has resulted in some special purpose machines and various combinations of electronic and optic elements However, efforts to configure optical computers have met with many of the same constraints encountered by early electronic computers. Useful components are still evolving and are not readily available commercially for the most part. Limitations on the number and kinds of devices for practical applications suggests reconsideration of the serial nature of early electronic computers and implementation along those lines.

For instance, some of the early serial computers used mercury delay lines for memory and later shifted to magnetic drums along with a small number of flip-flop circuits and a diode array. They followed a bit-serial approach because a parallel implementation of a given function such as an adder would require N times as many devices.

Electrooptic switches have developed which are optical guided wave devices produced by diffusing precisely placed titanium waveguides into high purity optical lithium niobate crystals. These are referred to as lithium niobate or $LiNbO_3$ electrooptic switching elements. Such an element is capable of accepting dual light inputs (A and B), one to each light waveguide, and transmitting that light to the light waveguide outputs (D and E, respectively).

In the absence of an externally applied switching voltage at a control electrode (C) but with application of correct bias voltage, light entering at point A will couple to the neighboring waveguide and emerge at E. Conversely, light entering at B will emerge at D. This is known as the "crossed state". Whenever the correct voltage is applied to control electrode C, light entering at A emerges from its own waveguide at D whereas light entering at B emerges at its output E. This is known as the "bar state".

Commercially available such devices are several centimeters in length with appropriate optical fiber connectors. Specifications for a typical such commercial switch are: wavelength (lambda) of 1300 nm. switching speed of 0.3 ns., switching voltage of 5–8 volts, bias voltage of approximately 5 volts, an on-off cross-talk of less than 20 dB, and an insertion loss of under 7 dB. The switching is nonlinear and, while it does not exhibit complete saturation at maximum switching value, its sinusoidal characteristic does provide insensitivity to voltage in this region.

SUMMARY OF THE INVENTION

The present invention is a logic system device advantageously employing a directional optic coupler such as a lithium niobate switch and an optical fiber loop as a delay line memory. A feature of this invention is that this logic system useful to implement modules capable of performing optical computer related functions. In its ultimate configuration, it is possible to organize the various components into the architecture of a bit serial or parallel optical computer.

In utilizing a lithium niobate type of switch, the switching voltage is generated by a photodiode amplifier combination thereby converting the switch to a five terminal optical device. Thus, using the same convention as above relative to the optic switch, all device terminals are optically operated. Although the photodiode amplifier section technically makes the device an optoelectronic device rather than an all optical one, the switching and input/output functionality is all effected optically. The electronics advantageously shapes the incoming pulse as is described in greater detail later herein.

The computer architect can model this invention as two interconnected 1×2 multiplexers. The logic functions synthesizable from the directional coupler in a clocked system include AND, AND-NOT, or, NOT, buffer, 2×1 multiplexer, and 1×2 demultiplexer. The conventional 3 dB coupler is used as a splitter and combiner. The splitter permits optical fanout of the signal. The combiner serves as optical equivalent of the "wired or" gate. From this it is readily apparent the switch of this invention has considerable utility as a design component for more complex logic arrays.

Apparatus in accordance with this invention is configured for performing optical logic functions in conjunction with a source of light pulses. The optical switch includes first and second input terminals with the first terminal coupled to receive light pulses from the source. At least one optical waveguide establishes an optical output terminal for the switch. An electrode responsive to light at the second optical switch input terminal directs light at the first input terminal into this optical waveguide.

An optical delay line is coupled to receive light pulses from the switch waveguide and to deliver those light pulses at the second input terminal after passage of a predetermined time period. Accordingly, introduction of a light pulse to the delay line from a light pulse source results in continual rejuvenation of the light pulse by gating subsequent pulses from the source into the optical delay line.

The capacity of the above mentioned logic device to function as a memory is established by selecting the optical delay line length to correlate to the desired time delay for a plurality of light pulses resident in the delay line at any given time.

The light pulses from the source can represent a series of data bits which are continuously recycled through the delay line. A light data utilization output structure can thus receive those data bits by use of yet another splitter for selectively diverting those data bits into the light data utilization device.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
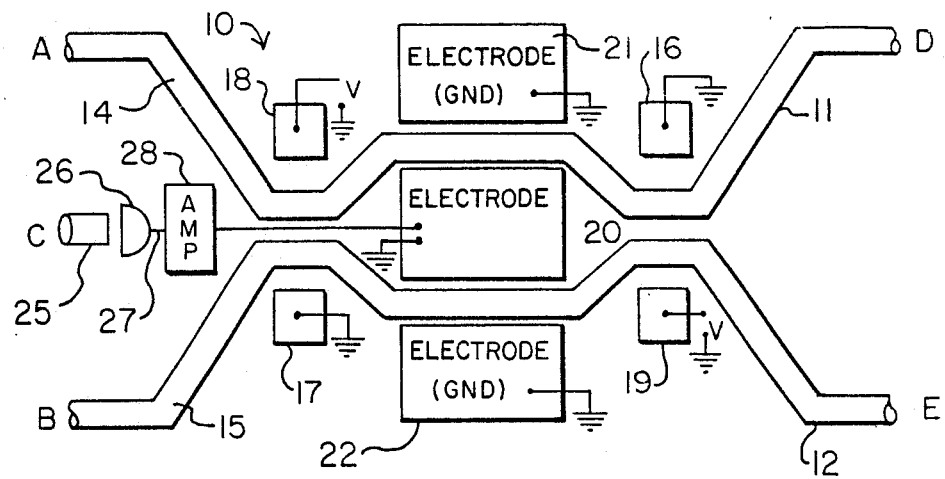
FIG. 1 is an electrooptic switch configured to interface on a completely optic basis for input/output and switching.

FIG. 1 shows an optic switch module 10 utilizing an optical waveguide device as the switching element thereof. The primary optical switching element is preferably a conventional lithium niobate or $LiNbO_3$ type of device. The lithium niobate electrooptic switch is an optical guided wave device produced by diffusing precisely placed titanium waveguides into high purity optical lithium niobate crystals. These elements are shown schematically in FIG. 1 as waveguides 14 and 15 with inputs A and B and outputs D and E.

Electrodes 16–19 are arrayed relative to the input and output sections as shown. Electrodes 16 and 17 are grounded while electrodes 18 and 19 are typically biased with about 5 volts, for example. A switching electrode 20 is adapted to have a switching voltage applied thereto such as about 8 volts. Intermediate electrodes 21 and 22 are grounded.

In the absence of an externally applied voltage at electrode 20 but with correct bias voltages applied to electrodes 18 and 19, light entering at input point A into waveguide 14 will couple to the neighboring waveguide 15 and emerge at output point E. Likewise, light entering at input point B into waveguide 15 will couple to waveguide 14 and emerge at output point D. This is referred to as the "crossed state".

Applying the correct voltage to electrode 20 causes light entering at input A to emerge at output D, and light entering at input B emerges at output E. This is referred to as the "bar state". Specifications for a typical commercially available such switch are set forth in the previously herein as background information.

In accordance with the present invention, the switch of FIG. 1 is operated as a five terminal network optical device. This is accomplished by introducing an optical input from source 25 into a photodiode 26 with its output signal over connection 27 driving amplifier 28. The output of amplifier 28 controls the state of electrode 20. Since the electronics are externally transparent to the functioning of the device, the FIG. 1 structure is considered an all optical device. However, as described later, the electronics is advantageous in shaping incoming pulses.

Figure 2:
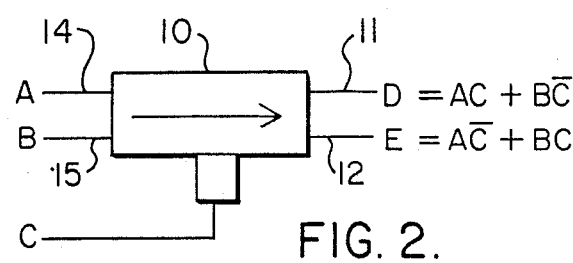
FIG. 2 is a symbolic representation of the logic operation of the FIG. 1 switch.

From the perspective of computer architecture and design, the device is useful as two interconnected 1×2 multiplexers with functionality and symbolism illustrated in FIG. 2. The logical outputs to switch element 10 corresponding to inputs A and B as controlled by the presence or absence of input C is depicted in FIG. 2 in Boolean terminology.

Figure 5:
FIG. 5 is a table of logic functions that can be synthesized in accordance with this invention.
Figure 5:
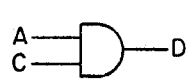
Figure 5:
Figure 5:
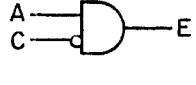
Figure 5:
Figure 5:
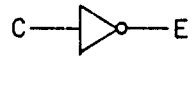
Figure 5:
Figure 5:
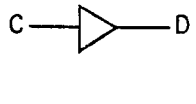
Figure 5:
Figure 5:
Figure 5:
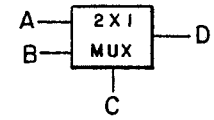
Figure 5:
Figure 5:
Figure 5:
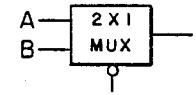
Figure 5:
Figure 5:
Figure 5:
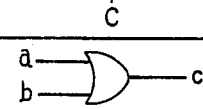

FIG. 5 illustrates the logic functions that the user can synthesize from the above described directional coupler in a clocked system. As FIG. 5 shows, the switch 10 has considerable utility as a design component. FIG. 5 also shows two additional optical circuit elements termed splitters and combiners. The splitter is a conventional 3 dB optical splitter that permits fan out of the optical signal. The combiner serves as the optical equivalent of the so called wired-or gate.

Figure 3:
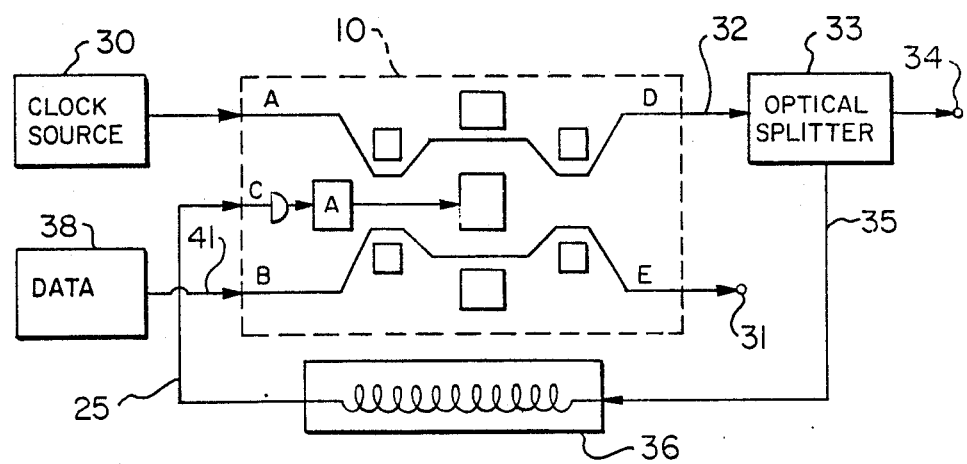
FIG. 3 is an optical delay line memory in accordance with the present invention.

FIG. 3 is an optical delay line memory in accordance with the present invention. It incorporates the optical logic element 10 which is driven by a source of optical pulses 30 into its input A. These pulses are either introduced as a crossed coupling to output 31 in the absence of an input at C or, in the presence of such a signal, they are bar coupled to output B on connection 32. In a typical operation, an initial clock pulse from source 30 is introduced to output 32 and divided by optical splitter 33 so as to appear on connection 35 and readout terminal 34.

Except when readout data is desired, the output light pulses on line 35 are introduced to optical delay line 36 which is a preselected length of fiber optic cable as is discussed further below. After a length of time corresponding to the length of fiber optic cable 36, the optical pulse will emerge and enter input connection 25 into the optical detector 26 and amplifier 28 of switching unit 10.

In its preferred embodiment, the optical delay line memory of FIG. 3 is a loop of optical fiber whose length is $l = ml_c$ where l is the loop length in meters, m is the numbered of bits the loop is to store, and $l_c$ is the distance travelled by the optical pulse during one clock pulse period. Furthermore, $l_c = tv$ where t is the clock period and v is the speed of light in the medium. Note that v is related to the speed of light "in vacuo", c, by $v = c/n$ where n is the refractive index in the medium. In terms of the clock frequency, $f = 1/t$ so $l = mc/(fn)$.

For glass fibers where $n = 1.5$, 1024 16 bit words are storable in a loop of length 3.3 meters at a clock frequency of 1 THz($= 10^{12}$ Hz), and in a loop of 33 km at a clock frequency of 100 MHz. There is an upper limit to the number of bits such a loop can store before the thermal coefficients of length and refractive index of the fiber cause significant changes in the optical length of the fiber unless there is compensation for such coefficients.

Typical glass fibers have a coefficient of linear expansion of approximately $1 \times 10^{-6}$ per degree C., and the thermal coefficient of refractive index of glass ranges from $-10$ to $+19 \times 10^{-6}$ per degree C. with values of $+10$ typical of fused silica. Thus an uncompensated fiber loop has an upper bound on the number of bits that are storable of about $10^4$. This bound is increased considerably by one or more of the following: (a) careful temperature control, (b) encoding the clock signal in the data circulating in the loop, (c) controlling the properties of the fiber so that the length changes due to thermal effects are compensated by refractive index changes, or (d) measuring the drift and compensating for it by adjustments such as in the clock frequency. Changes in the optical length are correctable by clocking the system with a clock signal that is subjected to the same temporal perturbations as the signals in the loop.

However, under some circumstances, trimming of the length of the fiber making up coil 36 may prove adequate so as to avoid the need for compensation.

Techniques are presently known as to how to compensate optical delay lines to correct for the effects of thermal expansion or contraction. However, if compensation is not employed, approximately 10K bits are storable in delay line 36. The length is 2 km if the clock source operates at 100 mHz, and 100 meters a 2 gigahertz.

Accordingly, the clock source 30 is not only a timing source but also a signal level source. Clock pulse cleanup or restoration is accomplished by the switch 10 and its operational interrelationship with optical delay line 36. The controlled exchange elements 10 and delay line 36 as described in conjunction with FIG. 3 make it possible to perform a variety of functions architecturally without the need for flip-flop circuits, static registers, or their equivalents.

With respect to synchronization and amplitude restoration in the delay line memory shown in the embodiment of FIG. 3, all fibers exhibit loss. In commercial fibers, this loss may range from 0.5 to 10 dB per km and component insertion loss may range up to about 7 dB. Thus some means of amplitude restoration is essential. Furthermore, a means is required to insert and retrieve information in the loop. The circuit of FIGS. 3 and 4 provides both synchronization and amplitude restoration by interrupting the loop to allow the bit stream to refresh itself by switching a copy of the clock 30 signal at A into the loop.

Figure 4:
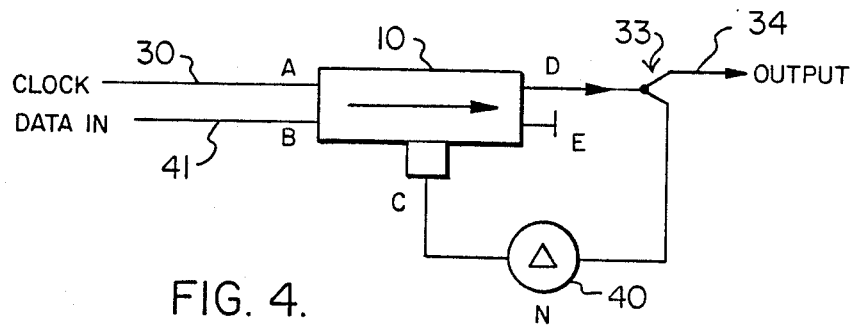
FIG. 4 is a symbolic representation of the FIG. 3 component operation.

With regard to FIG. 4, the loop 40 which includes elements 25, 35 and 36 of FIG. 3 is of sufficient length to accommodate N bits. Splitter 33 permits sampling of the signal into output terminal 34. Initializing data is written into the loop at B input 41. The total loss around the loop is 10 dB: 7 dB at switch 10 and 3 dB at switch 33. These losses are compensated for by the electronic gain at control terminal 25 in association with the signal at input point C. A particular advantage of the present invention in copying the clock signal to restore amplification is that cross talk and accumulated noise are minimized.

In a typical application, clock source 30 is provided by a 850 nm laser modulated at the desired frequency. The duty cycle is adjusted to less than 50%. The electronics at the control terminal C of the switch will stretch the pulse somewhat. This is because the switch is preferably in the desired state prior to the arrival of the pulse at the output of waveguide 25 and should remain in that state until after the pulse has left the device. This prevents the occurrence of glitches and runt pulses.

A given device and clock speed will have a particular combination of duty cycle and delay that are optimum. The principle factors governing duty cycle and delay are rise and fall times of the electronics at terminal C, and clock jitter. The latter will become significant at clock rates of greater than 100 MHz where detectors begin to exhibit data dependent delays.

The design technique employed in conjunction with this invention does not use flip-flops or latches for synchronization. Instead, it relies upon temporal synchronization during the design process. This means fiber lengths are calculated so that pulses arrive at key places in the circuit (i.e.: switches, splitters and combiners) in synchronization. Delays in fibers and devices are computed from the refractive index of the material. Delays in the detector and amplifier circuits are measurable.

In practice, the designer can compute the optical length for each fiber of the device including the control fiber (25), and include it in the design calculation. Delays for the control input would include both the actual optical delay and any delay introduced by the drive electronics and detector. It may prove helpful to perform initial design iterations assuming no delays anywhere except those that are desired. Thereafter the effects of delays are taken into account when calculating fiber interconnection lengths.

For any given set of components, there is an upper bound on clock speed. Among the factors involved in fixing the upper clock speed are clock rise and fall times, control electronics rise and fall times, device rise and fall times, and/or minimum delay. The latter becomes important when designing circuits having feedback such as carry loops.

Figure 6:
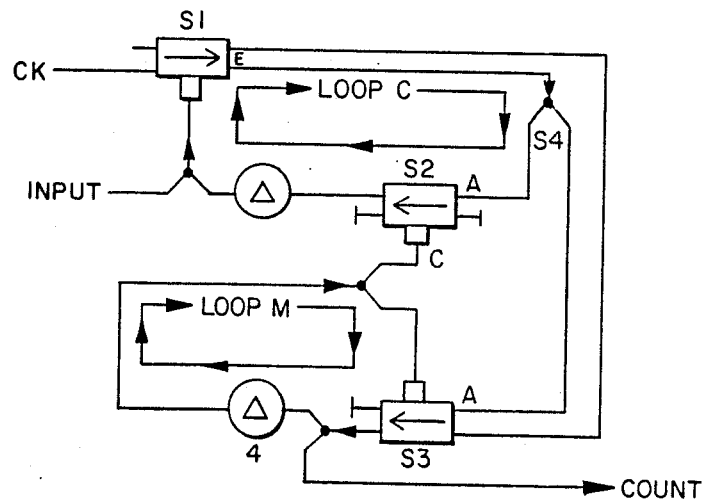
FIG. 6 is a four bit counter employing this invention.

Loop C of the four bit counter illustrated in FIG. 6 is an example of a system involving a design having a loop along the lines of that mentioned in the preceding paragraph. The total delay around loop C must equal the clock period t because a bit in the delay loop must travel the loop and arrive at switch S1 just in time to switch the next incoming pulse. Therefore the calculated delay loop length must equal or exceed the optical lengths of the fibers. If the loop length is greater, then additional fiber is needed in the loop to make the length equal. Notice that the optical length of the path through S1 is greater than the path length through S2. This is due to the additional length in the former as a result of the control electronics at terminal C.

From the foregoing, it is apparent that only a single optical switch and delay are required to create a serial memory loop. However, those having normal skill in the art will recognize that the contents of such a loop is readily alterable for computer design purposes. The simple loop allows an OR function of bits at the terminal adjacent to the clock, but FIG. 7 illustrates a more general memory loop.

Figure 7:
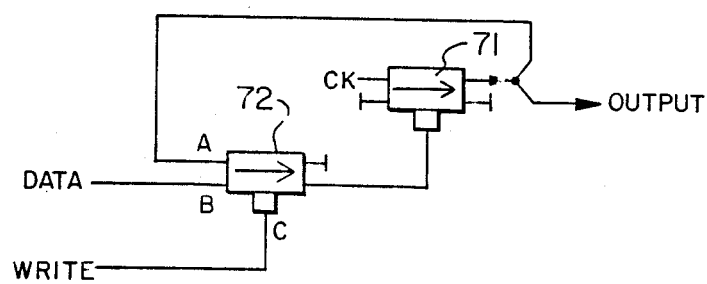
FIG. 7 is a delay line memory including means to write data therein.

In FIG. 7, a second switch 72 is added to provide for the insertion of new data into the loop. When the Write control input C to switch 72 is not asserted, the resulting cross state of switch 72 completes the simple delay loop. Conversely, when the control input is asserted, new data from terminal B of switch 72 is inserted into the loop. The timing of the new data must match that of the old in order for regeneration to continue.

A serial N-bit counter is shown in FIG. 6 which is designed to function as a four bit counter. Incoming pulses which require counting occur at the Input terminal synchronously with the first pulse of each group of four clock pulses. Arrival of an incoming pulse switches a copy of the arriving clock pulse to fiber E of splitter S1. This pulse is split at switch S4 and sent to switches S2 and S3.

Accumulated bits circulate in loop M, a memory loop similar to those discussed earlier. An N-bit counter will have a delay loop containing N bits, so, for this four bit counter, loop M has delay of four bits. Notice that if no bit is arriving at input C of switch S3 from loop M when the input bit arrives at input A for switch S3, the arriving bit is switched into loop M.

On the other hand, if a bit is arriving at the control input of switch S3 from loop M while an input bit is arriving at input A, then the bit from M is not copied back into M. The input bit at input A is switched back into the carry loop where it will emerge again one clock period later and the process will repeat. In the absence of input or carry bits, the pattern at M will continue to circulate in the manner described previously herein.

When the loop is filled with ones, the next arriving bit will overflow resetting the loop to all zeroes and the process will repeat.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for performing optical logic functions comprising a source of light pulses, an optical switch including first and second input terminals with said first terminal coupled for receiving light pulses from said source, at least one optical waveguide establishing an optical output terminal, and an electrode responsive to light at said second input terminal for directing light at said first input terminal into said optical waveguide, and an optical delay line coupled to receive light pulses from said waveguide and to deliver said light pulses at said second input terminal after passage of a predetermined time period, whereby introduction of a light pulse to said delay line results in continual rejuvenation of said light pulse by gating subsequent pulses from said source into said optical delay line.

2. Apparatus in accordance with claim 1 wherein said optical delay line has a length for concurrently retaining a plurality of said light pulses.

3. Apparatus in accordance with claim 1 wherein light pulses from said source represent a series of data bits which are continuously recycled through said delay line, said apparatus further including light data utilization means, and means coupling said data bits into said light data utilization means.

* * * * *

UNITED STATES PATENT AND TRADEMARK OFFICE
CERTIFICATE OF CORRECTION

PATENT NO. : 4,900,115
DATED : Feb. 13, 1990
INVENTOR(S) : Vincent P. Heuring, Harry F. Jordan, Jonathan P. Pratt It is certified that error appears in the above-identified patent and that said Letters Patent is hereby corrected as shown below:

Column 1, line 19, after "elements", insert --.--.

Column 1, line 34, after "devices", insert --where N is the word size--.

Column 4, line 32, delete "numbered" and insert --number--.

Column 5, line 6, after "meters", delete "a" and insert --at--.

Claim 3, Column 8, line 19, after "means", insert --for--.

Signed and Sealed this

Twelfth Day of February, 1991

Attest:

HARRY F. MANBECK, JR.

*Attesting Officer*      *Commissioner of Patents and Trademarks*